United States Patent [19]
Carr et al.

[11] Patent Number: 5,640,398
[45] Date of Patent: Jun. 17, 1997

[54] STATE MACHINE ARCHITECTURE FOR CONCURRENT PROCESSING OF MULTIPLEXED DATA STREAMS

[75] Inventors: Larrie Carr, Burnaby; Winston Mok, Vancouver, both of Canada

[73] Assignee: PMC-Sierra, Inc., Burnaby, Canada

[21] Appl. No.: 551,530

[22] Filed: Nov. 1, 1995

[51] Int. Cl.$^6$ ........................................................ H04J 3/16
[52] U.S. Cl. ............................ 370/376; 370/518; 375/373
[58] Field of Search ............................................ 370/360, 375, 370/376, 503, 505, 516, 517, 518, 537, 907; 375/362, 365, 366, 371, 372, 373, 376

[56] References Cited

U.S. PATENT DOCUMENTS

| | | | |
|---|---|---|---|
| 4,520,479 | 5/1985 | Grima et al. | 370/68 |
| 4,972,407 | 11/1990 | Kawai | 370/68 |
| 4,974,223 | 11/1990 | Ancheta et al. | 370/106 |
| 5,317,572 | 5/1994 | Satoh | 370/108 |

*Primary Examiner*—Alpus H. Hsu
*Attorney, Agent, or Firm*—Oyen Wiggs Green & Mutala

[57] ABSTRACT

A plurality of data streams time-division multiplexed into a single stream are concurrently processed. State vectors characteristic of each data stream are stored in unique read-write memory locations having known addresses. During an initial clock cycle the next sequential data word is received from the single data stream and an input state vector characteristic of the data stream in which the received data originated is retrieved from the memory. The data word and the input state vector are passed to state machine logic which, during one or more intermediate clock cycles, processes the data word and the input state vector to produce an output data word and an output state vector. During a final clock cycle the output data word is transferred to an outgoing data stream and the output state vector is stored in the memory location from which the input state vector was retrieved. The process repeats sequentially, with the next group of three clock cycles commencing immediately after the initial clock cycle of the immediately preceding group of three clock cycles.

10 Claims, 1 Drawing Sheet

STATE MACHINE ARCHITECTURE FOR CONCURRENT PROCESSING OF MULTIPLEXED DATA STREAMS

FIELD OF THE INVENTION

This application is directed to a pipelined, time-sliced state machine architecture for processing time-division multiplexed data streams.

BACKGROUND OF THE INVENTION

In multiplexed data streams, a number of similar data streams are interleaved in time to form one continuous data stream. The Bellcore Synchronous Optical Network (SONET) is a communication standard pursuant to which similar modules of information are byte interleaved together to form the SONET data stream.

In the prior art, the multiplexed modules are traditionally demultiplexed to yield the original data streams. Each module data stream is then manipulated using state machine logic dedicated to that stream. This architecture accordingly requires N separate state machines to handle a multiplexed data stream of N modules. A sizable amount of duplicated logic is required when N is large, with only one state machine being active during any given time period.

The PM5361 SONET/SDH Tributary Unit Payload Processor (TUPP) of PMC-Sierra, Inc., Burnaby, British Columbia, Canada, partially solved this problem by using a time-sliced state machine architecture. In this architecture, the state vector for each virtual state machine is stored in a random access memory (RAM). When a byte of data of an information module arrives, the state vector for that time-slice is retrieved from the RAM, processed using combinational state machine logic, and written back into the RAM. This architecture thus requires 3 clock cycles to perform the state machine's read/process/write cycle. To solve this problem, three copies of the time-sliced state machine are provided, with the data being demultiplexed into three multiplexed data streams.

A further problem with the time-sliced state machine architecture is that a single state machine can not handle the full bandwidth of the multiplexed data stream unless a three times faster clock and RAM are available. As well, the need for multiple time-sliced state machines means that some arbitrary multiplexing patterns can not be processed. For some multiplexing patterns, two or more copies of the time-sliced state machine would "see" the same module if the number of clock cycles between the module's time-slices were not a multiple of three.

The present invention provides an improved state machine architecture for concurrent processing of time-division multiplexed data streams. The architecture is capable of handling the full bandwidth of the multiplexed data stream without demultiplexing it. A system clock rate equal to the data rate can be used. The RAM speed can be comparable to the incoming data rate. Multiplexing schemes common to SONET standards can be handled.

SUMMARY OF THE INVENTION

In accordance with the invention, a plurality of data streams time-division multiplexed into a single stream are concurrently processed. State vectors characteristic of each data stream are stored in unique read-write memory locations having known addresses. During an initial clock cycle the next sequential data word is received from the single data stream and an input state vector characteristic of the data stream in which the received data originated is retrieved from the memory. The data word and the input state vector are passed to state machine logic which, during one or more intermediate clock cycles, processes the data word and the input state vector to produce an output data word and an output state vector. During a final clock cycle the output data word is transferred to an outgoing data stream and the output state vector is stored in the memory location from which the input state vector was retrieved. The process repeats sequentially.

The invention further provides apparatus for concurrently processing a plurality of data streams time-division multiplexed into a single stream, each data stream containing a plurality of data words and having a characteristic state vector. A read-write memory is provided with a plurality of addressable memory locations for storing the state vectors. During a first clock cycle, a pipeline receives: an input data word (from one of the data streams), an input state vector characterizing that data stream (from a predefined memory address), and the predefined address of the received state vector. During a second clock cycle the pipeline processes the input data word and the input state vector to yield an output data word and an output state vector. During a third clock cycle the pipeline transfers the output data word to an outgoing data stream, and stores the output state vector in the predefined memory location address. A control means synchronizes operation of the memory and the pipeline.

DETAILED DESCRIPTION OF THE PREFERRED EMBODIMENT

Figure 1:
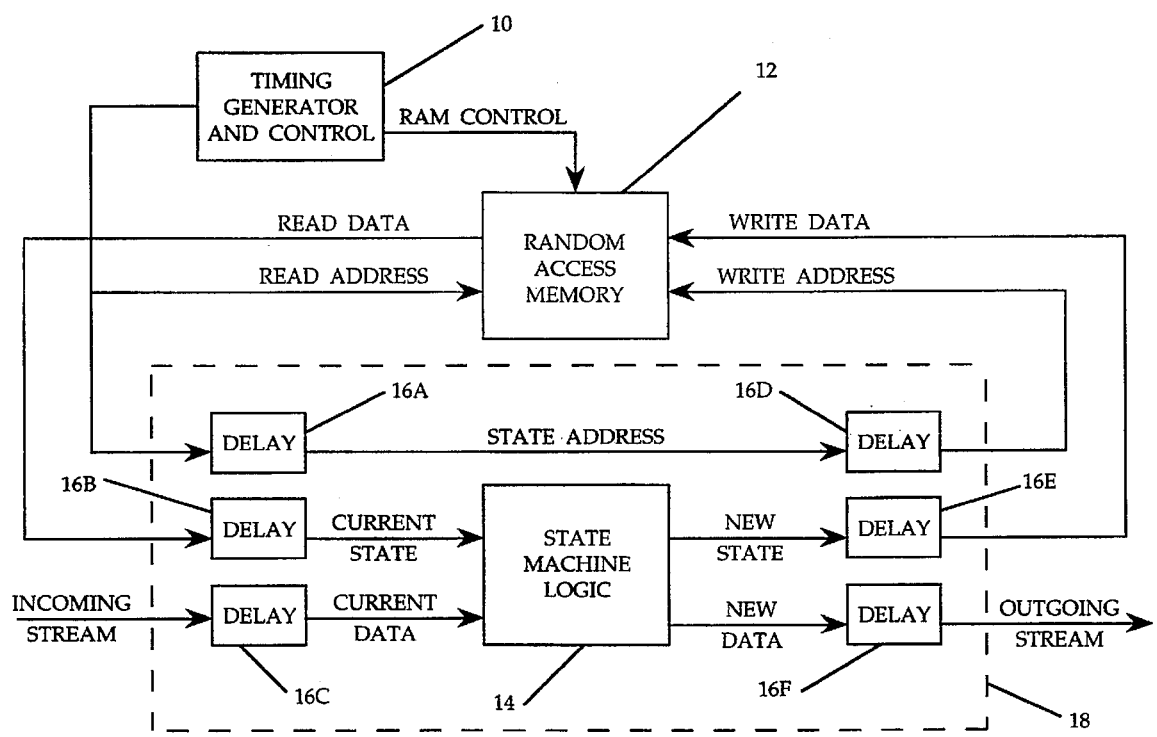
FIG. 1 is a block diagram depiction of a state machine architecture for concurrent processing of multiplexed data streams in accordance with the invention.

With reference to FIG. 1, Timing Generator and Control block 10 identifies each time-slice of the incoming multiplexed data stream and controls RAM 12. State vectors which characterize the information modules being processed in the incoming multiplexed data stream are stored in unique read-write memory locations having known addresses within RAM 12. A "logic means", namely State Machine Logic block 14 contains combinational logic which implements the desired state transitions and data stream manipulations. Delay blocks 16a–16f may be flip/flops or latch type delay elements configured to form a data pipeline 18 having a length of one clock cycle.

In operation, Timing Generator and Control block 10 is synchronized to the ordering of the time-slices in the incoming data stream. As a word of data of an information module arrives in the multiplexed data stream, the Timing Generator prefetches the state vector for that time-slice from RAM 12. The state vector, the RAM address used to retrieve the state vector, and the data word are inserted into the pipeline. More particularly, during the first (or initial) clock cycle, the state vector retrieved from RAM 12 is fed into Delay block 16b, the RAM address from which that state vector was retrieved is fed into Delay block 16a, and the data word is fed into Delay block 16c.

State Machine Logic block 14 performs the desired state transitions and data manipulations on the time-slice information during the next (i.e. second, or intermediate) clock cycle. This yields a new state vector which is output from State Machine Logic block 14 and fed into Delay block 16e during the second clock cycle; and, a new data word which is output into Delay block 16f (also during the second clock cycle). The new data word may or may not be identical to the input data word, depending upon the manipulations dictated by the state vector. While State Machine Logic block 14 processes the state vector and data word, Timing Generator and Control block 12 prefetches the state vector for the next time-slice.

The new state vector output by State Machine Logic block 14 is written back from Delay block 16e into RAM 12 during the next (i.e. third, or final) clock cycle. Due to the pipeline nature of the design, the RAM address for the time-slice must be carried with the state vector to ensure that the new state vector is written back into the correct RAM location. Thus, the RAM address from which the original state vector was retrieved is fed from Delay block 16a to Delay block 16d, and is then used to perform the write back of the new state vector into RAM 12. If a given time-slice of the incoming data stream is to be ignored, Timing Generator and Control block 10 inhibits write back into RAM 12 for that time-slice, effectively deeming the pipeline to contain non-information.

It can thus be seen that, whereas the prior art TUPP system's combinational state machine logic can process a state vector during only one of each group of three read/process/write clock cycles (i.e. during only the "process" cycle), the invention facilitates processing of state vectors during each and every clock cycle. Data throughput is thus trebled without additional state machine logic. More particularly, the initial, intermediate and final clock cycles are repeated in endless, grouped succession. Thus, the final clock cycle in a first group of initial/intermediate/final clock cycles occurs simultaneously with the intermediate clock cycle in a second such group immediately following the first group and simultaneously with the initial clock cycle in a third such group immediately following the second group. Accordingly, immediately after the initial clock cycle of the first group initiates that group's read/process/write cycles, the initial clock cycle of the second group occurs to initiate the second group's read/process/write cycles; and, immediately after the initial clock cycle of the second group initiates that group's read/process/write cycles, the initial clock cycle of the third group occurs to initiate the third group's read/process/write cycles.

The invention is limited to processing of certain multiplexing patterns. In particular, if RAM 12 supports write-through during a read cycle, then time-slices for a given information module may not be any closer than one clock cycle apart. If RAM 12 does not support write-through during a read cycle, then time-slices for a given information module may not be any closer than two clock cycles apart. If the time-slices were closer, then Timing Generator and Control block 10 would retrieve a stale state vector from RAM 12 while the pipeline processed the previous occurrence of the time-slice. As SONET usually multiplexes three or more information modules in a sequential manner, this limitation does not present a practical problem.

As will be apparent to those skilled in the art in the light of the foregoing disclosure, many alterations and modifications are possible in the practice of this invention without departing from the spirit or scope thereof. For example, a single port type RAM may be used instead of a dual port type RAM if multiple RAM accesses can be performed during each clock cycle. Thus, a RAM write-read cycle could be performed for each incoming time-slice, effectively duplicating the function of a dual port type RAM. By writing the new state vector to the RAM before reading the current state vector, a write-through mechanism would be implemented. As another example, a longer pipeline may be provided. Thus, if State Machine Logic block 14 can not generate the new state vector and/or new data word in one clock period, the entire pipeline could be lengthened to distribute the processing over multiple clock cycles (i.e. processing may occur during one or more of the second or intermediate clock cycles). Such a change would affect the minimum allowed distance between time-slices of the same information module, as explained above. Accordingly, the scope of the invention is to be construed in accordance with the substance defined by the following claims.

What is claimed is:

1. Apparatus for concurrently processing a plurality of data streams time-division multiplexed into a single stream, each of said data streams containing a plurality of data words and having a characteristic state vector, said apparatus comprising:

a. read-write memory means having a plurality of addressable memory locations for storing said state vectors;

b. a pipeline for:
  i. during an initial clock cycle:
   (1) receiving an input data word from one of said data streams;
   (2) receiving, from a predefined memory location address in said memory means, an input state vector characterizing said one data stream;
   (3) receiving said predefined memory location address of said input state vector;
  ii. during one or more intermediate clock cycles, processing said input data word and said input state vector to yield an output data word and an output state vector;
  iii. during a final clock cycle:
   (1) transferring said output data word to an outgoing data stream;
   (2) transferring said output state vector to said predefined memory location address in said memory means; and, c. control means coupled to said memory means and to said pipeline for synchronizing operation thereof.

2. Apparatus as defined in claim 1, wherein said pipeline further comprises first delay means, second delay means and state machine logic means, wherein:

a. said first delay means is for:
  i. delayed storage and output to said state machine logic means of said input data word and said input state vector;
  ii. delayed storage and output to said second delay means of said predefined memory location address;

b. said state machine logic means performs said processing during said one or more intermediate clock cycles;

c. said second delay means is for:
  i. delayed storage and output to said memory means of said output state vector and said predefined memory location address; and,
  ii. delayed storage and output of said output data word.

3. Apparatus as defined in claim 1, wherein:

a. said control means further comprises a clock having a selected clock cycle; and, b. said pipeline has a delay characteristic equal to one of said clock cycles.

4. Apparatus as defined in claim 1, wherein:

a. said control means further comprises a clock having a selected clock cycle; and, b. said pipeline has a delay characteristic equal to a selected multiple of said clock cycles.

5. Apparatus as defined in claim 1, wherein said memory means is a random access memory.

6. A method of concurrently processing a plurality of data streams time-division multiplexed into a single stream, said method comprising the steps of:
   a. for each one of said data streams, storing a state vector characteristic of said one stream in a read-write memory location having a predefined address;
   b. during an initial clock cycle:
      i. receiving a next sequential data word from said single stream, said data word originating in one of said plurality of data streams;
      ii. retrieving from one of said memory locations an input state vector characteristic of said originating one of said plurality of data streams;
   c. after said initial clock cycle, delivering said data word and said input state vector to a state machine logic means and then, during one or more intermediate clock cycles following said initial clock cycle, processing said data word and said input state vector in said state machine logic means to produce an output data word and an output state vector;
   d. during a final clock cycle following said one or more intermediate clock cycles:
      i. transferring said output data word to an outgoing data stream;
      ii. storing said output state vector in said memory location from which said input state vector was retrieved; and,
   e. sequentially repeating said steps b, c and d.

7. A method as defined in claim 6, further comprising performing said processing of said data word and said input state vector during one and only one of said intermediate clock cycles.

8. A method as defined in claim 6, further comprising performing said processing of said data word and said input state vector during a selected plurality of said intermediate clock cycles.

9. A method as defined in claim 6, further comprising, during said processing of said data word and said input state vector, preserving said address of said memory location from which said input state vector was retrieved.

10. A method as defined in claim 6, wherein said initial, intermediate and final clock cycles are repeated in endless, grouped succession such that a final clock cycle in a first such group occurs simultaneously with an intermediate clock cycle in a second such group immediately following said first group and simultaneously with an initial clock cycle in a third such group immediately following said second group, said method further comprising:
   a. immediately after said initial clock cycle of said first group, initiating repetition of said steps 6(b) through 6(e) with respect to said second group; and,
   b. immediately after said initial clock cycle of said second group, initiating repetition of said steps 6(b) through 6(e) with respect to said third group.

* * * * *